United States Patent Office 3,534,102
Patented Oct. 13, 1970

3,534,102
REACTION PRODUCTS OF ELEMENTAL IODINE
AND ALKOXYLATED ALKYLAMINE OXIDES
David A. Waldstein, 622 Bergen Ave.,
Jersey City, N.J. 07305
No Drawing. Filed Sept. 6, 1967, Ser. No. 665,741
Int. Cl. A61k 7/04, 27/00; C07c 93/02
U.S. Cl. 260—584                                    2 Claims

ABSTRACT OF THE DISCLOSURE

The reaction products of elemental iodine and alkoxylated alkylamine oxides of the formula:

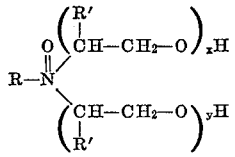

wherein R is alkyl having from 1 to 25 carbon atoms, each R' is hydrogen or methyl, and $x+y$ is in the range of 2 to 50. The compounds are useful in the treatment of hemorrhoids and for conditioning human nails.

---

The present invention relates to novel reaction products of elemental iodine and alkoxylated alkylamine oxides. More particularly, the invention relates to reaction products of elemental iodine and alkoxylated alkylamine oxides which are useful in the treatment of hemorrhoids and for conditioning human nails.

The invention consists in the novel compositions, steps, processes, combinations and improvements herein described.

It is an object of the invention to provide novel reaction products of elemental iodine and alkoxylated alkylamine oxides. It is another object of the invention to provide a method for the treatment of hemorrhoids and for the relief of rectal itching by the use of novel reaction products of elemental iodine and alkoxylated alkylamine oxides. These and other objects of the invention will in part be obvious and in part become apparent to one skilled in the art in the light of the instant specification and claims which follow hereinafter.

In its broad aspect, the invention relates to reaction products of elemental iodine and alkoxylated alkylamine oxides of the formula:

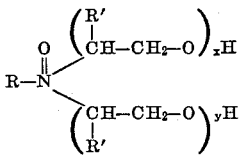

wherein R is alkyl having from 1 to 25 carbon atoms, each R' is hydrogen or methyl, and $x+y$ is in the range of from 2 to 50.

The preferred compounds of the invention are those wherein R is alkyl having from 12 to 22 carbon atoms and $x+y$ is in the range of from 5 to 40.

The alkyl group identified in the formula as R is preferably a fatty alkyl group free of acetylenic unsaturation. Preferable alkyls are saturated fatty alkyls, such as palmityl, stearyl, and the like, as well as fatty alkenyls, such as oleyl, linoleyl, linolenyl, and the like. In general, for commercial reasons, said alkyl group will represent a mixture of the above-identified alkyls since commercial fatty acids, which are used in preparing the amine starting materials, are seldom pure.

While not wishing to be bound by the present theory, applicant postulates that said reaction products are hypoiodus quaternary ammonium compounds having the following formula:

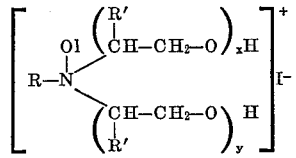

wherein R, R', $x$ and $y$ are as indicated hereinbefore.

The compounds of the invention can be prepared by the oxidation of a previously alkoxylated alkylamine, and by treating the resulting oxidation product with elemental iodine, preferably in equimolar amounts.

The examples which follow set forth in detail the method of preparing compounds representative of the present invention.

EXAMPLE I

Commercial hydrogenated tallow amine, which consists essentially of stearylamine, is reacted with approximately 25 molar equivalents of ethylene oxide.

1450 g. of the resulting ethoxylated product is heated to about 90° C. and 154 g. of diethyl sulfate is added slowly with vigorous agitation to the resulting mixture. After the alkalinity of the reaction drops to about 0–4 mg./g. KOH, the reaction product is allowed to cool to room temperature.

EXAMPLE II

To 85 g. of the reaction mixture obtained in Example I there is added with vigorous agitation 15 g. of iodine.

After all the iodine is dissolved, there is obtained a clear reaction product, soluble in cold water.

EXAMPLE III

To 1450 g. of ethoxylated hydrogenated tallow amine, containing about 25 molar equivalents of ethylene oxide and heated to a temperature of about 35° C., there is added slowly, with vigorous agitation, 110 g. of 35% hydrogen peroxide. After mixing for two hours, the temperature of the reaction mixture is raised to about 60° C. and the mixture is stirred for an additional two hours.

After being allowed to stand overnight at room temperature, the reaction mixture is heated to about 70–80° C. to remove all unreacted hydrogen peroxide and then cooled to room temperature.

EXAMPLE IV

To 85 g. of the reaction product of Example III there is added, slowly and with vigorous agitation, 15 g. of iodine. The foaming which results is controlled by the addition of 2–3 ml. of isopropanol.

After all the iodine dissolves, there is obtained a clear liquid product, soluble in cold water.

It is to be pointed out that, in the first step of Example I, the alkylamine can be reacted with propylene oxide or with ethylene oxide-propylene oxide mixtures to obtain products falling within the scope of the present invention.

Table I, which follows, sets forth a representative number of novel compounds according to the present invention.

TABLE I

| No. | R | R' | $x+y$ |
|---|---|---|---|
| 1 | Tallow [1] | H | 25 |
| 2 | do | H | 40 |
| 3 | Soyabean [2] | H | 25 |
| 4 | do | CH₃ | 30 |
| 5 | Oleyl | H | 25 |

[1] Contains about 75% of stearyl and palmityl, and 25% of oleyl.
[2] Contains about 52% of linoleyl, 33% of oleyl 7% of stearyl and palmityl, and 8% of others.

As indicated hereinabove, the products of the present invention are useful for the treatment of hemorrhoidal conditions and for the relief of rectal itching. Said compounds are applied topically to the affected area and any suitable carrier, which will not react with said compounds and which is pharmaceutically acceptable for the particular application, can be utilized.

For the treatment of external hemorrhoids and for the relief of itching, a suitable method of application has been to contact the affected area with a dilute aqueous solution of one of the compounds. For example, 1 to 2 ounces of the compound is added to a bathtub full of water, which in general has a useful capacity of about 14 gallons. The patient then immerses the affected area in the water and remains therein for a period of about 15 to 20 minutes, avoiding the use of soap for said period.

After bathing daily as indicated above for a period of about 1 to 12 weeks, substantial improvements in the above-mentioned conditions are experienced.

As will be apparent to one skilled in the art, the compounds of the invention can also be applied in the form of suppositories or creams, which are formulated according to standard accepted procedures. Said forms are particularly desirable in the treatment of internal hemorrhoids.

In said forms, a percentage of active ingredient in the range of from 0.01 to 0.5 has been found to give satisfactory results.

In addition, it has been found that the compounds of the invention have beneficial effect when applied, either by themselves or in a suitable base, to human nails, conditioning said nails, rendering them less brittle and increasing their resistance to cracking and splitting.

The invention in its broader aspects is not limited to the specific compositions, processes and steps down and described but departures may be made therefrom within the scope of the accompanying claims without departing from the principles of the invention and without sacrificing its chief advantages.

What is claimed is:
1. A compound of the formula

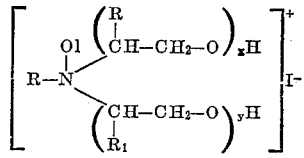

wherein R is alkyl having from 1 to 25 carbon atoms, each $R^1$ is hydrogen or methyl, and $x+y$ is in the range of from 2 to about 50.

2. The compound of claim 1, wherein R is alkyl having 10 to 22 carbon atoms.

References Cited
UNITED STATES PATENTS
3,047,579   7/1962   Witman.

CHARLES B. PARKER, Primary Examiner

R. L. RAYMOND, Assistant Examiner

U.S. Cl. X.R.
260—583; 424—150, 325